UNITED STATES PATENT OFFICE.

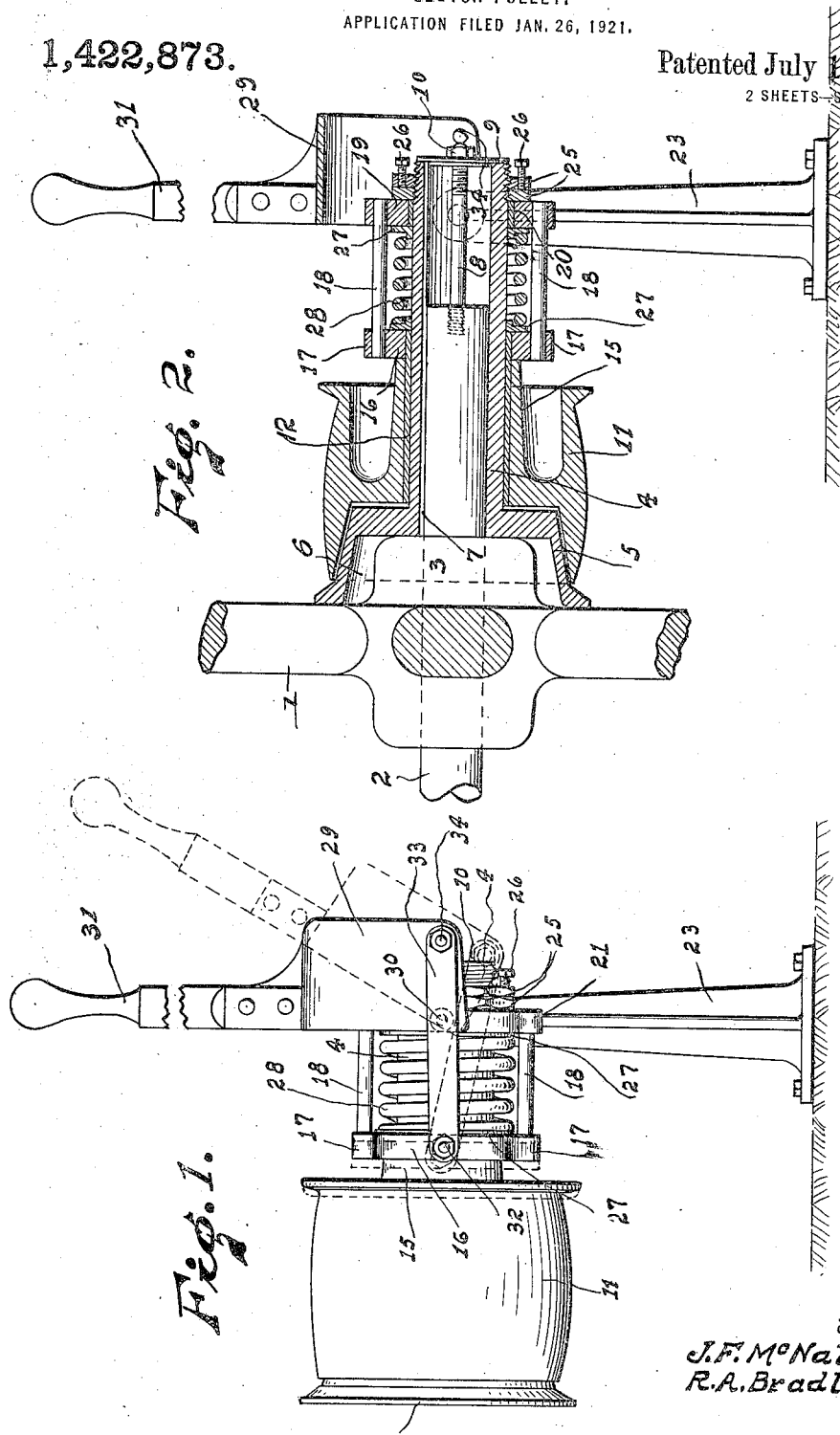

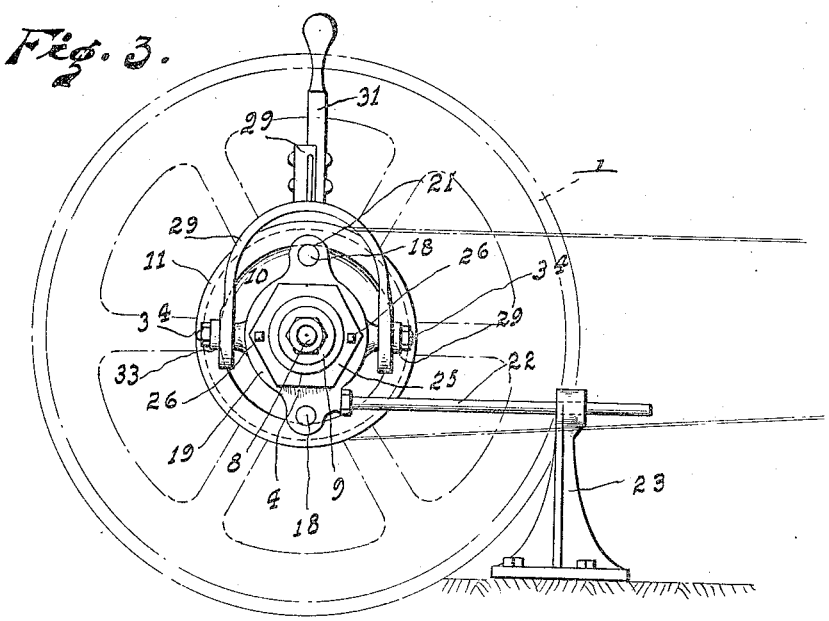
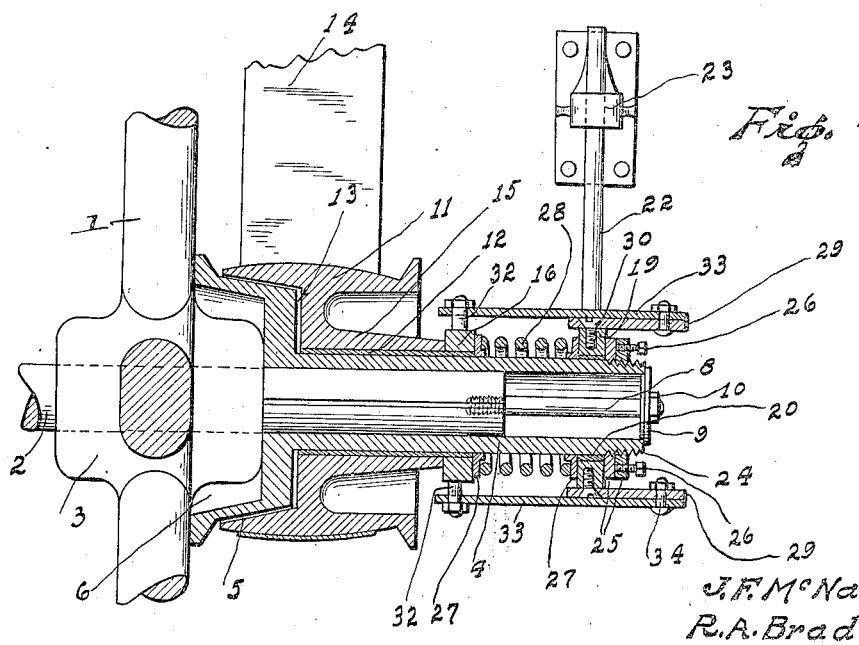

JOHN F. McNALLY AND RALPH A. BRADLEY, OF EMPORIA, KANSAS.

CLUTCH PULLEY.

1,422,873.  Specification of Letters Patent.  Patented July 18, 1922.

Application filed January 26, 1921. Serial No. 440,071.

*To all whom it may concern:*

Be it known that we, JOHN F. MCNALLY and RALPH A. BRADLEY, citizens of the United States, residing at Emporia, in the county of Lyon and State of Kansas, have invented certain new and useful Improvements in Clutch Pulleys, of which the following is a specification.

Our invention relates to clutch pulleys and has for its object the provision of a simple device whereby the transmission of power from a motor to driven machinery may be arrested without stopping the motor. The invention is intended more particularly for use in connection with internal combustion engines to permit a temporary stoppage of the driven machinery without requiring a stoppage of the engine. The invention is illustrated in the accompanying drawings and will be hereinafter fully set forth.

In the drawings—

Figure 1 is a side elevation of a clutch pulley embodying our improvements;

Fig. 2 is a longitudinal vertical section of the same;

Fig. 3 is an end view thereof;

Fig. 4 is a horizontal section.

In the drawings, the reference numeral 1 indicates a portion of the fly wheel of an internal combustion engine which is carried by the engine shaft 2, as will be readily understood, and in the present instance the said engine shaft is extended through and beyond the hub 3 of the fly wheel. In carrying out our invention, we fit upon the extended portion of the engine shaft a sleeve 4 which is constructed at its end immediately adjacent the fly wheel with an enlarged head 5 having its outer circumference tapered toward its outer end and having its inner end hollow, as indicated at 6, to provide a chamber which will fit over one end of the hub. This sleeve 4 is keyed upon the shaft, as indicated at 7, and is held against endwise movement and clamped against the hub 3 and against the spokes of the fly wheel by a bolt 8 inserted through a cap plate 9 and having its inner end threaded into the extremity of the engine shaft, as clearly shown. The cap plate 9 extends over the outer open end of the sleeve 4 and a nut 10 mounted upon the outer extremity of the bolt is turned home against the cap plate so as to clamp the same firmly against the outer end of the sleeve and thereby, in turn, clamp the sleeve against the fly wheel. The sleeve, as will be readily understood, is thus compelled to rotate with the fly wheel and its head constitutes one member of the clutch. The band pulley 11 encircles the inner portion of the sleeve 4 and a bushing 12 of bronze or Babbitt metal or similar material is inserted between the hub of the pulley and the outer circumferential surface of the sleeve so that it may have a running fit upon the sleeve and will rotate with the pulley. The inner end of the pulley 11 is constructed with a chamber 13 which receives the head 5 of the sleeve 4 and the annular wall of this chamber is flared toward the inner end of the pulley, as clearly shown, so that it will conform to the tapered surface of the head and is adapted to bind thereon when the operating handle is manipulated in the proper manner. In the position shown in the drawings, the pulley is out of contact with the head, and the head and the engine shaft may, therefore, rotate without imparting any motion to the pulley. Obviously, however, if the pulley be forced toward the fly wheel, the flared annular wall of the chamber 13 will bind upon the circumferential surface of the head and the pulley will, consequently, rotate with the head and the engine shaft, and the belt 14, trained around the pulley, will be set in motion to operate the driven machinery. Upon the outer end of the bushing 12 and bearing against the outer extremity of the hub 15 of the pulley is a slidable collar or frame 16 which is provided at its top and bottom with eyes 17 slidably engaging the inner ends of supporting and guiding pins 18. The pins 18 are fixed at their outer ends in a frame 19 similar to the frame 16 and a bushing 20 is fitted between the sleeve 4 and the said outer frame 19 so that while the sleeve may rotate freely the wear upon the bearing surface of the frame 19 will be minimized. The frame or collar 19 is constructed with upper and lower eyes 21 in which the outer ends of the pins 18 are fixed and the said frame is also secured rigidly to one end of a supporting rod 22 which extends laterally from the frame and is loosely fitted in the upper end of a pedestal 23. By providing this rod or bar 22, the frame 19 is held against all movement but the engine may be shifted with respect to the pedestal or stand 23 so as to compensate for stretching of the belt, as will be readily understood. The outer extremity of the sleeve 4 is threaded, as shown at 24, and upon this threaded extremity we mount the lock nuts 25 which are turned home against the frame 19 so as to prevent endwise movement of the sleeve inwardly through the frame, set screws 26 being carried by the outer lock nut and bearing against the inner nut to prevent release of the nuts. Encircling the sleeve 4 and resting against the opposed faces of the frames 16 and 19 and the ends of the bushings within said frames are washers 27 and between the said washers and bearing against the same a spring 28 is coiled around the sleeve. It will be readily seen that expansion of this spring will tend to move the frame 16 inwardly and thereby drive the pulley into binding engagement with the driving head 5. Pivotally mounted upon the outer frame 19 at diametrically opposite points of the same is a lever head 29 which may conveniently be in the form of a stirrup or inverted bail having its inner lower corners disposed immediately adjacent the frame 19 in the horizontal plane of the engine shaft to receive cap screws 30 which are inserted through the side members of the head 29 into the frame 19 to pivotally attach the head to the frame, as clearly shown in Fig. 4. The handle 31 is rigidly secured to the head 29 and extends upwardly therefrom to facilitate the shifting of the head and the consequent adjustment of the pulley. The frame 16 is provided upon its sides at diametrically opposite points with studs 32 over which the inner ends of links 33 are pivotally fitted, the outer ends of said links being pivoted by studs or screws 34 to the outer corners of the lever head 29, as shown.

It is thought the operation and advantages of the device will be readily understood from what has been said. When the apparatus is inoperative, the handle 31 stands upright, as clearly shown in the drawings, and in this position the members 32, 30 and 34 are in one horizontal plane, the frame 17 being drawn outwardly and the spring 28 being under compression. When it is desired to transmit power to the driven machinery, the lever handle is thrown downwardly to the position shown in dotted lines in Fig. 1, whereupon the outer ends of the links 33 will swing downwardly and also inwardly inasmuch as they move with the outer corners of the lever head 29 about the points 30 as pivots, the frame 19 being held against circular movement by the rod 22, as previously stated and as will be readily understood. When the outer ends of the links 33 thus move downwardly and inwardly, the inner ends of said links will move inwardly in the plane of the engine shaft and will carry the frame 16 in the same direction so that it will be shifted to the position indicated in dotted lines in Fig. 1 and, consequently, the pulley will be driven onto the head 5 in binding engagement therewith and will be forced to rotate with the head. When it is desired to stop the operation, the handle is simply thrown upwardly and the parts are returned to the position shown in full lines thereby withdrawing the pulley from its binding engagement with the driving head.

It will be readily understood that we have provided an exceedingly simple device which may be easily manipulated and by which the belt pulley may be thrown into or out of engagement with the driving head without stopping the engine. The parts are all of very simple construction so that the apparatus may be made and installed at a low cost and if any part should be broken, it may be easily renewed or repaired so that the cost of upkeep will be slight. The pressure is borne by the several bushings so that the shifting elements are relieved of end thrust while the pulley is at work, the outward pressure of the spring being taken up by the washer 27, the bushing 20, and nuts 25.

Having thus described the invention, what is claimed as new is:

1. The combination with an engine shaft, and a sleeve secured thereon, said sleeve being provided with a clutch head at its inner end, of a pulley fitted about the sleeve and having a clutch chamber in one end receiving and adapted to engage the said clutch head, a shifter frame slidably fitted upon the sleeve and bearing against the outer end of the pulley, a second frame fitted about the outer end of the sleeve, means for holding the said second frame in a fixed position, a lever head pivoted to the said second frame, a link pivotally attached at its inner end to the shifter frame and having its outer end pivoted to the lever head eccentric to the pivotal connection between the said head and the said second frame, and a spring coiled around the sleeve between the shifter frame and the said second frame.

2. The combination with an engine shaft, and a sleeve mounted thereon, said sleeve having a clutch head at its inner end, of a pulley fitted about the sleeve and provided at one end with a clutch chamber receiving and adapted to engage the said clutch head, a shifter frame fitted about the sleeve and bearing against the outer end of the pulley, a second frame fitted about the outer end of the sleeve and held against movement, pins carried by the said second frame and slidably engaged by the shifter frame, a spring coiled about the sleeve between the shifter frame and the said second frame, a lever pivoted upon the second frame, and a link pivoted at its inner end to the shifter frame and having its outer and eccentrically pivoted to the lever.

In testimony whereof we affix our signatures.

JOHN F. McNALLY. [L. S.]
RALPH A. BRADLEY. [L. S.]